(12) United States Patent
Gao et al.

(10) Patent No.: US 12,540,809 B2
(45) Date of Patent: Feb. 3, 2026

(54) GAP MEASURING DEVICE

(71) Applicant: CHINA THREE GORGES CORPORATION, Wuhan (CN)

(72) Inventors: Chao Gao, Wuhan (CN); Zhiwei Wang, Wuhan (CN); Yuxin Li, Wuhan (CN); Qi Yu, Wuhan (CN); Jie Yu, Wuhan (CN)

(73) Assignee: CHINA THREE GORGES CORPORATION (CN)

( * ) Notice: Subject to any disclaimer, the term of this patent is extended or adjusted under 35 U.S.C. 154(b) by 348 days.

(21) Appl. No.: 18/455,336

(22) Filed: Aug. 24, 2023

(65) Prior Publication Data
US 2024/0068794 A1 Feb. 29, 2024

(30) Foreign Application Priority Data
Aug. 26, 2022 (CN) .......................... 202211037005.2

(51) Int. Cl.
*G01B 5/14* (2006.01)

(52) U.S. Cl.
CPC ...................................... *G01B 5/14* (2013.01)

(58) Field of Classification Search
CPC .... G01B 5/14; G01B 3/26; G01B 5/02; Y02E 60/10
See application file for complete search history.

(56) References Cited

U.S. PATENT DOCUMENTS

2024/0068794 A1\* 2/2024 Gao .......................... G01B 3/26

FOREIGN PATENT DOCUMENTS

| CN | 211425273 U | * | 9/2020 | |
|---|---|---|---|---|
| CN | 213363674 U | * | 6/2021 | |
| CN | 213840085 U | * | 7/2021 | |
| CN | 114034233 A | * | 2/2022 | ............... G01B 5/14 |
| CN | 115265334 B | * | 6/2023 | ............... G01B 5/02 |

\* cited by examiner

*Primary Examiner* — Yaritza Guadalupe-McCall

(57) ABSTRACT

A gap measuring device is provided, which includes a base; a driving assembly including a first driving structure including a first moving part being capable of moving on the base in a first direction and a second driving structure being connected to the first moving part and including a second moving part being capable of moving in a second direction which is perpendicular to the first direction; and a measuring mechanism including a measuring rod bracket, a first measuring rod and a second measuring rod, a first end of the first measuring rod being provided with a first detection head, a first end of the second measuring rod being provided with a second detection head, a second end of the second measuring rod being provided with a pointer, the first detection head and the second detection head being located on the same side of the measuring rod bracket.

9 Claims, 16 Drawing Sheets

GAP MEASURING DEVICE

CROSS-REFERENCE TO RELATED APPLICATIONS

This application claims priority to Chinese Application No. 202211037005.2, having a filing date of Aug. 26, 2022, the entire contents of which are hereby incorporated by reference.

FIELD

The present invention relates to the technical field of measuring instruments, and more particularly, to a gap measuring device.

BACKGROUND

Structural gaps are commonly found in civil engineering, industrial and civil buildings. Gaps may be roughly divided into two categories, wherein one category refers to cracks caused by overstressing-induced structural failure, such as structural cracks, brittle fractures, and settlement cracks; and the other category refers to construction gaps, which are specially preset gaps required by construction, such as seismic joints and temperature expansion joints of modern structures, as well as gaps reserved between mortise and tenon nodes in traditional wood buildings for easy installation. Although some gaps are necessary for building structures, the existence of gaps poses potential safety risks to the structural safety, especially the safety hazards under the action of earthquakes. For example, when there are gaps in beam-column joints, the joint stiffness and bearing capacity will be greatly reduced.

In order to analyze the mechanical properties of the beam-column joints with gaps, it is necessary to find out the actual size of each gap, or at least obtain a maximum gap value. Since the gap between the beam-column joints is hardly measured, a ruler is mostly used to measure directly at the outer edge of the gap at present, ignoring the change in width inside the gap. However, the internal structure of the gap is relatively complex, presenting a common phenomenon of honeycomb pitting, so a width value of the outer edge of the gap cannot represent an internal width of the gap. The current simplified measurement often cannot accurately reflect the actual width of the gap.

SUMMARY

Therefore, the technical problem to be solved by the present invention is to overcome the defects in the prior art that cannot accurately measure an actual width of a gap, thereby providing a gap measuring device that can accurately measure an actual width of a gap.

In order to solve the above technical problem, the present invention provides a gap measuring device, comprising: a base, adapted to be fixedly disposed on a measured object; a driving assembly, disposed on the base, the driving assembly including a first driving structure and a second driving structure, the first driving structure comprising a first moving part, the first moving part being capable of moving on the base in a first direction, the second driving structure being connected to the first moving part, the second driving structure comprising a second moving part, the second moving part being capable of moving in a second direction relative to the first moving part, and the second direction being perpendicular to the first direction; a measuring mechanism, comprising a measuring rod bracket disposed on the second moving part, as well as a first measuring rod and a second measuring rod which are hinged with the measuring rod bracket through a measuring rod shaft, a first end of the first measuring rod being provided with a first detection head, a first end of the second measuring rod being provided with a second detection head, a second end of the second measuring rod being provided with a pointer, the first detection head and the second detection head being located on the same side of the measuring rod bracket; a torsion spring, comprising a first fixed leg and a second fixed leg, the first fixed leg being connected to the second end of the first measuring rod, and the second fixed leg being connected to the second end of the second measuring rod; and a scaleplate holder, one end of which being fixedly connected to the second end of the first measuring rod, the scaleplate holder comprising a rectangular frame provided with scales, the pointer being disposed in the rectangular frame.

Optionally, the rectangular frame is provided with two cursors which are spaced from each other, the two cursors are respectively located on both sides of the pointer, and the pointer is capable of pushing one of the cursors to move on the rectangular frame while moving in the rectangular frame.

Optionally, the first driving structure comprises:
two first supports, fixedly disposed on the base, the two first supports being spaced and opposite to each other, each of the first supports being rotatably provided with a first screw hole;
first screws, disposed in the first screw holes, a first end of each first screw extending out of one of the first supports;
first hand wheels, fixedly connected to the first ends of the first screws; and
first ball nuts, sleeving the first screws and being connected in cooperation with the first screws, the first ball nuts constituting the first moving part.

Optionally, the base is provided with two first slideways parallel to each other, and the second driving structure comprises:
two second supports, spaced and disposed relative to each other, the second supports are disposed in one-to-one correspondence to the first slideways, each second support being slidably disposed on the corresponding first slideway, each of the second supports being connected to the first ball nut through a connector and provided with a second screw hole;
second screws, rotatably disposed in the first screw holes, a first end of each second screw extending out of one of the second supports;
second hand wheels, fixedly connected to the first ends of the second screws; and
second ball nuts, sleeving the second screws and being connected in cooperation with the second screws, the second ball nuts constituting the second moving part.

Optionally, the base comprises a bottom plate; the bottom plate is provided with two bar holes spaced from each other, and the bar holes constitute the first slideway; each second support comprises a body part and a clamping edge formed by downward extension of one end of the body part facing the bottom plate; the clamping edge is disposed in the bar holes; an end surface of one end of the body part facing the bottom plate is provided with a plurality of first ball holes; the first balls are rollably disposed in the first ball hole; and the first balls are in contact with the bottom plate.

Optionally, the measuring rod bracket has a fixed notch, the fixed notch being clamped on the second ball nut;

and/or, a measuring rod shaft hole is formed in the middle of each of the first measuring rod and the second measuring rod, the measuring rod bracket is provided with a bracket shaft hole, and the measuring rod shaft passes through the bracket shaft hole and the rod shaft holes in sequence;

and/or, a second end of the first measuring rod is provided with a first spring fixing hole, a second end of the second measuring rod is provided with a second spring fixing hole, the first fixed leg is inserted in the first spring fixing hole and is capable of rotating relative to the first measuring rod, and the second fixed leg is inserted in the second spring fixing hole and is capable of rotating relative to the second measuring rod;

and/or, the first detection head and the second detection head each have a cross-section of a right triangle, wherein one of a right-angled edge is connected to the first measuring rod or the second measuring rod.

Optionally, the base is provided with a plurality of binding seats, the binding seats each have an opening facing the outside of the base, and a binding rod is disposed in each binding seat, and is adapted to be connected to the measured object through a binding member.

Optionally, the second end of the first measuring rod is provided with a first recording pen; the pointer is connected to a second recording pen; the first recording pen is parallel to the second recording pen; the base is further provided with a second slideway and a third slideway; the second slideway and the third slideway are parallel to each other and are located at both ends of the base, respectively; a length extension direction of the second slideway and the third slideway is consistent or parallel to the second direction; the gap measuring device further comprises a tracing mechanism, the tracing mechanism comprising:

a first bracket, slidably disposed on the second slideway;
a second bracket, slidably disposed on the third slideway,
a tracing board, connected between the first bracket and the second bracket, the first recording pen and the second recording pen being both capable of contacting the tracing board; and
a fourth slideway, two ends of which being respectively connected to the first bracket and the second bracket, a length extension direction of the fourth slideway being parallel to the first direction, the rod measuring bracket being connected to the fourth slideway through a slider, the slider being slidably disposed on the fourth slideway.

Optionally, a first pedestal is disposed at the bottom of the first bracket; the first pedestal is provided with a first groove with an opening facing downward; a shape of the first groove is adaptive with the second slideway; the top wall of the first groove is provided with a plurality of second ball holes; second balls are rollably disposed in each second ball hole; the second balls are in contact with the second slideway, and/or, a second pedestal is disposed at the bottom of the second bracket; an inverted T key is connected to the bottom of the second pedestal; the third slideway is a first sliding groove having an inverted T cross-section; an inverted T key is disposed in the first sliding way; a plurality of third ball holes is formed in the bottom of the second pedestal; third balls are rollably disposed in each third ball hole; the third balls are in contact with the surface of the base;

and/or, the first bracket is provided with a first clamping groove; the first clamping groove has a first top opening and a first side opening facing the second bracket; the second bracket is provided with a second clamping groove; the second clamping groove has a second top opening and a second side opening facing the first bracket; and two ends of the tracing board are clamped in the first clamping groove and the second clamping groove, respectively.

Optionally, the fourth slideway is provided with a second sliding groove; the second sliding groove has a T-shaped cross-section; the second sliding groove extends in a length direction of the fourth slideway; and the slider comprises a T-shaped part embedded in the second sliding groove.

The present invention has the following beneficial effects:

When the gap measuring device provided by the present invention is in actual use, the base is firstly fixedly connected to the measured object; the first driving structure then operates, so that the first moving part moves to one end of the base in the first direction; and the second driving structure operates, so that the second moving part moves to one end of the base in the second direction. Because the measuring rod bracket of the measuring mechanism is disposed on the second moving part, the measuring mechanism moves to one end of the base in the second direction as a whole; a relative position between the first measuring rod and the second measuring rod is then adjusted, so that the first measuring rod and the second measuring rod are tightly attached and flushed. Even if the first measuring rod and the second measuring rod are parallel to each other, the torsion spring is compressed at this time. The first end of the first measuring rod and the first end of the second measuring rod are stuffed into a deepest part of a measured gap, and the first measuring rod and the second measuring rod are released, such that the compression of the torsion spring is reduced, and the first detection head and the second detection head are respectively propped against to the corresponding gap sidewall. Because one end of the scaleplate holder is fixedly connected to the second end of the first measuring rod, and the pointer is disposed in the rectangular frame, a spacing between the second end of the first measuring rod and the second end of the second measuring rod is acquired according to a position of the pointer in the rectangular frame, and a space between the first detection head and the second detection head is calculated according to a ratio of an axis of the measuring rod shaft to a distance between the first end of the first measuring rod and the second end of the first measuring rod, and the width of the gap may be then obtained in combination with sizes of the first detection head and the second detection head themselves. Then, the first driving structure operates, so that the first moving part moves from one end to the other end of the base in the first direction, until the first end of the first measuring rod and the first end of the second measuring rod move from the deepest part of the measured gap to a gap opening, and the widths at different positions of the gap are continuously measured during the movement. Next, the second driving structure operates, so that the second moving part moves by a small distance in the second direction; and the first driving structure operates, so that the first moving part is reset to one end of the base in the first direction, and then the width of the gap is measured according to the above process until the measured gap is measured in a length direction, at which time the width of each position in the gap is measured. Therefore, this gap measuring device can accurately measure the actual width of the gap.

BRIEF DESCRIPTION OF THE DRAWINGS

To describe the embodiments of the present invention or the technical solutions in the prior art more clearly, the following briefly introduces the accompanying drawings required for describing the embodiments or the descriptions in the prior art. Apparently, the accompanying drawings in the following description show merely some embodiments of the present invention, and a person of ordinary skill in the art may still derive other drawings from these accompanying drawings without creative efforts.

REFERENCE SYMBOLS REPRESENT THE FOLLOWING COMPONENTS

Figure 1:
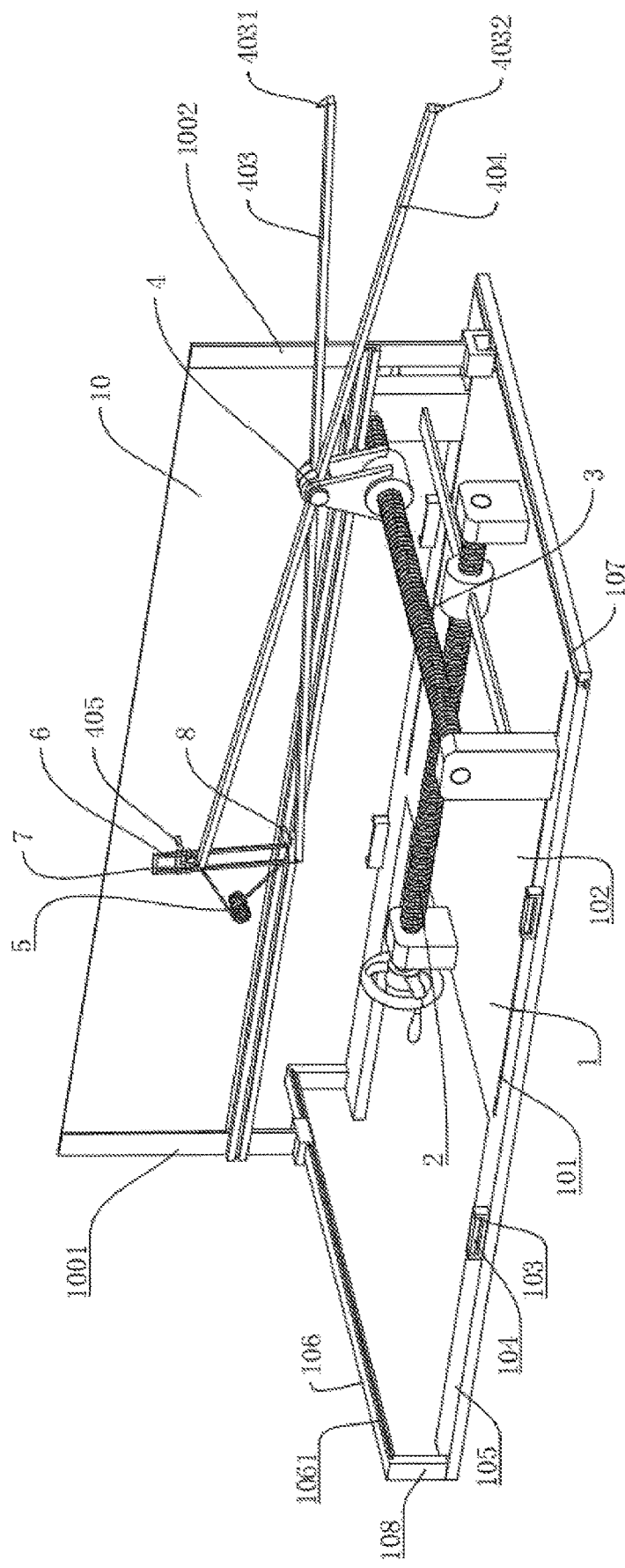
FIG. 1 is a schematic structural diagram of a gap measuring device provided in an embodiment of the present invention.

1—base; 101—first slideway; 102—bottom plate; 103—binding seat; 104—binding rod; 105—extension arm; 106—second slideway; 1061—third sliding groove; 107—third slideway; 108—supporting leg; 2—first driving structure; 201—first support; 2011—first screw hole; 202—first screw; 203—first hand wheel; 2031—first fixing hole; 204—first ball nut; 205—first handle; 3—second driving structure; 301—second support; 3011—second screw hole; 3012—body part; 30121—first ball hole; 3013—clamping edge; 3014—first ball; 302—second screw; 303—second hand wheel; 304—second ball nut; 305—second handle; 4—measuring mechanism; 401—measuring rod bracket; 4011—fixed notch; 4012—bracket shaft hole; 402—measuring rod shaft; 403—first measuring rod; 4031—first detection head; 4032—first spring fixing hole; 404—second measuring rod; 4041—second detection head; 4042—second spring fixing hole; 405—pointer, 4051—second connecting seat; 406—measuring rod shaft hole; 5—torsion spring; 501—first fixed leg; 502—second fixed leg; 6—scaleplate holder; 601—scale; 602—first connecting seat; 7—cursor, 701—bayonet; 8—first recording pen; 9—second recording pen; 10—tracing mechanism; 1001—first bracket; 10011—first pedestal; 100111—first groove; 100112—second ball hole; 100113—second ball; 10012—first clamping groove; 1002—second bracket; 10021—second pedestal; 10211—third ball hole; 10212—third ball; 10022—inverted T key; 10023—second clamping groove; 1003—tracing board; 1004—slideway; 10041—second sliding groove; 11—slider, and 1101—T-shaped part.

DETAILED DESCRIPTION

The technical solutions in the embodiments of the present invention will be clearly and completely described as follows in combination with the drawings in the examples of the present invention, but obviously, the described examples are only a part of the embodiments of the present invention, rather than all the embodiments. Based on the examples of the present invention, all other examples obtained by a person skilled in the art without creative efforts shall fall within the protection scope of the present invention.

Furthermore, the technical features involved in different embodiments of the present invention described as follows can be combined with each other as long as they do not conflict with each other.

Example

The present example provides a gap measuring device. The gap measuring device can accurately measure an actual width of a gap.

In one embodiment, as shown in FIGS. 1 to 17, the gap measuring device includes a base 1, a driving assembly, a measuring mechanism 4, a torsion spring 5 and a scaleplate holder 6.

The base 1 is adapted to be fixedly disposed on a measured object. The driving assembly is disposed on the base 1, the driving assembly including a first driving structure 2 and a second driving structure 3, the first driving structure 2 including a first moving part, the first moving part being capable of moving on the base 1 in a first direction, the second driving structure 3 being connected to the first moving part, the second driving structure 3 including a second moving part, the second moving part being capable of moving in a second direction relative to the first moving part, the second direction being perpendicular to the first direction. The measuring mechanism 4 includes a measuring rod bracket 401 disposed on the second moving part, as well as a first measuring rod 403 and a second measuring rod 404 which are hinged with the measuring rod bracket 401 through a measuring rod shaft 402, a first end of the first measuring rod 403 being provided with a first detection head 4031, a first end of the second measuring rod 404 being provided with a second detection head 1041, a second end of the second measuring rod 404 being provided with a pointer 405, the first detection head 4031 and the second detection head 4041 being located on the same side of the measuring rod bracket 401. The torsion spring 5 includes a first fixed leg 501 and a second fixed leg 502, the first fixed leg 501 being connected to the second end of the first measuring rod 403, and the second fixed leg 502 being connected to the second end of the second measuring rod 404. One end of the scaleplate holder 6 is fixedly connected to the second end of the first measuring rod 403. The scaleplate holder 6 includes a rectangular frame provided with scales 601, and the pointer 405 is disposed in the rectangular frame.

When the gap measuring device provided by the present embodiment is in actual use, the base 1 is firstly fixedly connected to the measured object; the first driving structure 2 then operates, so that the first moving part moves to one end of the base 1 in the first direction; and the second driving structure 3 operates, so that the second moving part moves to one end of the base 1 in the second direction. Because the measuring rod bracket 401 of the measuring mechanism 4 is disposed on the second moving part, the measuring mechanism 4 moves to one end of the base 1 in the second direction as a whole; a relative position between the first measuring rod 403 and the second measuring rod 404 is then adjusted, so that the first measuring rod 403 and the second measuring rod 404 are tightly attached and flushed. Even if the first measuring rod 403 and the second measuring rod 404 are parallel to each other, the torsion spring 5 is compressed at this time. The first end of the first measuring rod 403 and the first end of the second measuring rod 404 are stuffed into a deepest part of a measured gap, and the first measuring rod 403 and the second measuring rod 404 are released, such that the compression of the torsion spring 5 is reduced, and the first detection head 4031 and the second detection head 4041 are respectively propped against to the corresponding gap sidewall. Because one end of the scaleplate holder 6 is fixedly connected to the second end of the first measuring rod 403, and the pointer 405 is disposed in the rectangular frame, a spacing between the second end of the first measuring rod 403 and the second end of the second measuring rod 404 is acquired according to a position of the pointer 405 in the rectangular frame, and a space between the first detection head 4031 and the second detection head 4041 is calculated according to a ratio of an axis of the measuring rod shaft 402 to a distance between the first end of the first measuring rod 403 and the second end of the first measuring rod 403, and the width of the gap may be then obtained in combination with sizes of the first detection head 4031 and the second detection head 4041 themselves. Then, the first driving structure 2 operates, so that the first moving part moves from one end to the other end of the base 1 in the first direction, until the first end of the first measuring rod 403 and the first end of the second measuring rod 404 move from the deepest part of the measured gap to a gap opening, and the widths at different positions of the gap are continuously measured during the movement. Next, the second driving structure 3 operates, so that the second moving part moves by a small distance in the second direction; and the first driving structure 2 operates, so that the first moving part is reset to one end of the base 1 in the first direction, and then the width of the gap is measured according to the above process until the measured gap is measured in a length direction, at which time the width of each position in the gap is measured. Therefore, this gap measuring device can accurately measure the actual width of the gap.

Figure 9:
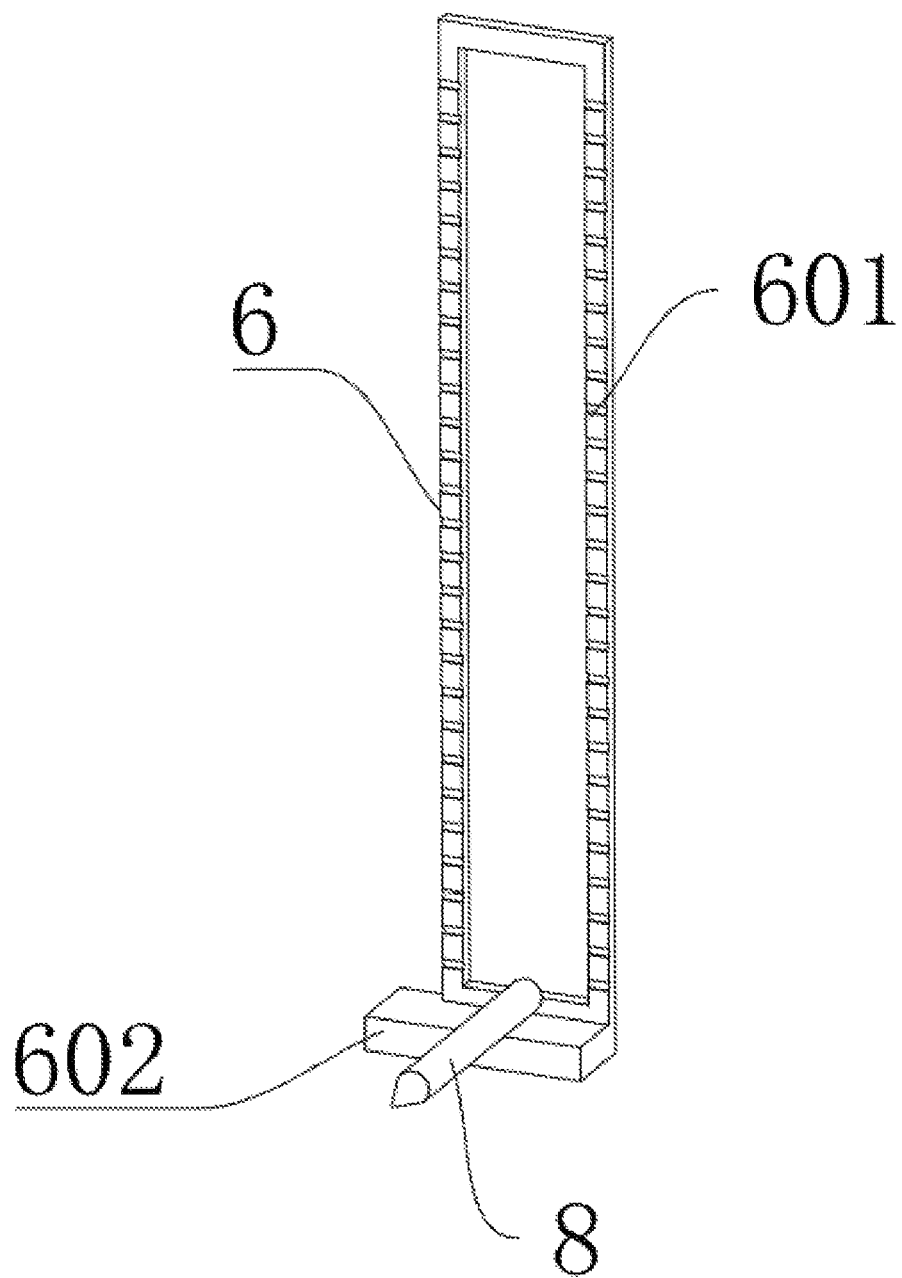
FIG. 9 is a schematic structural diagram of a scaleplate holder in FIG. 8.

As shown in FIG. 9, the scales 601 are disposed on two long sides of the rectangular frame, and fully distributed from one end to the other end. If a scale value corresponding to the lowest end is defined as 0, a scale value pointed by the pointer 405 is a spacing between the second end of the first measuring rod 403 and the second end of the second measuring rod 404. A first connecting seat 602 is disposed at the bottom of the scaleplate holder 6, which is fixedly connected to the second end of the first measuring rod 403 through the first connecting seat 602. A second connecting seat 4051 is disposed at one end of the pointer 405, which is fixedly connected to the second end of the second measuring rod 404 through the second connecting seat 4051.

In one preferred embodiment, the structure of the first measuring rod 403 is the same as that of the second measuring rod 404.

On the basis of the above embodiment, in one preferred embodiment, the middle of the first measuring rod 403 and the middle of the second measuring rod 404 are hinged with the measuring rod bracket 401 through the measuring rod shaft 402. At this time, the width of the gap can be directly acquired according to the scale 601 corresponding to the pointer 405 in the rectangular frame, instead of being calculated according to the ratio of the axis of the measuring rod shaft 402 to the distance between the first end of the first measuring rod 403 and the second end of the first measuring rod 403, making the whole measurement more convenient.

Figure 8:
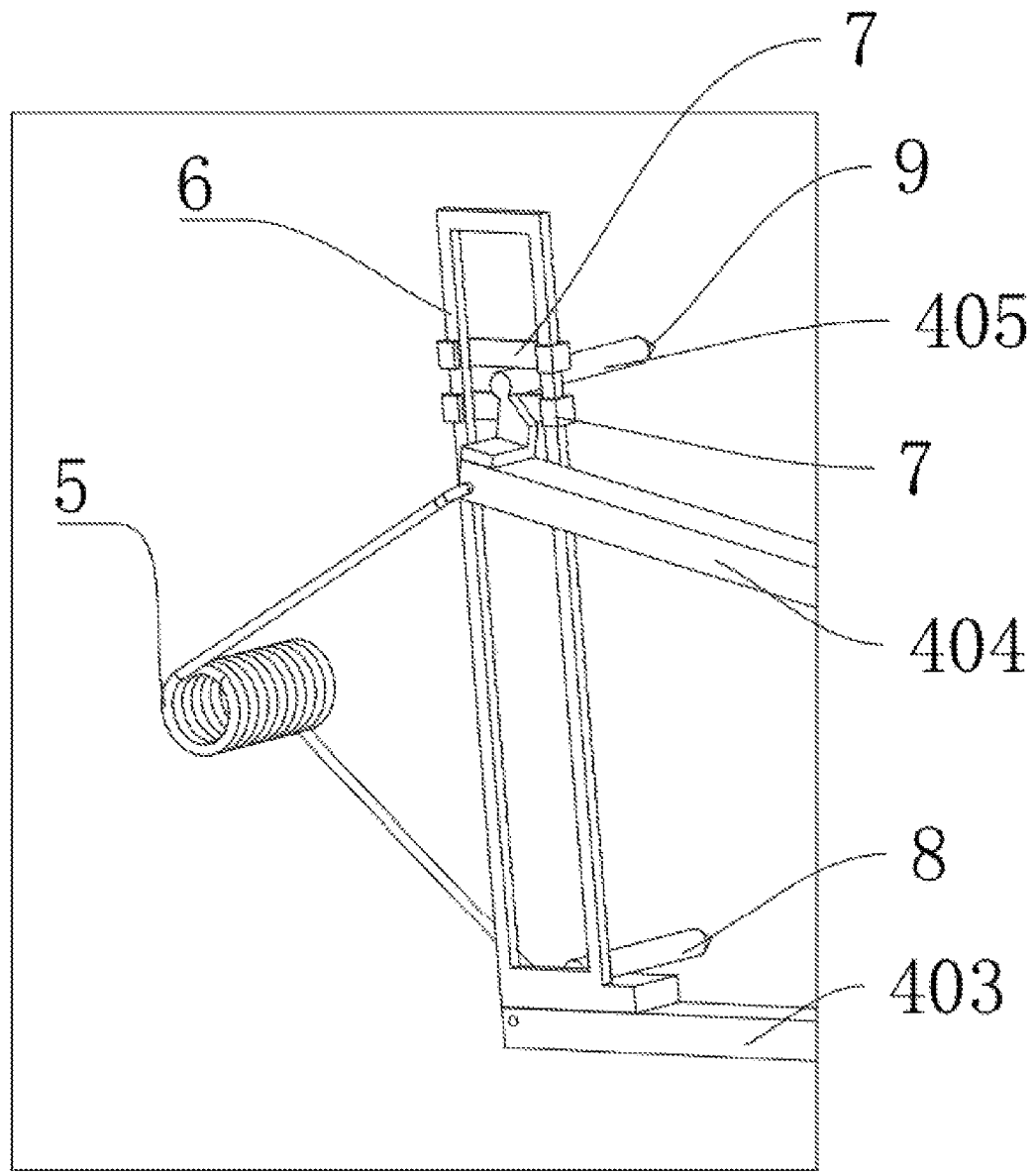
FIG. 8 is an enlarged view of Part A in FIG. 2.

On the basis of the above embodiment, in one preferred embodiment, as shown in FIG. 8, the rectangular frame is provided with two cursors 7 which are spaced from each other. The two cursors 7 are located on both sides of the pointer 405, respectively, and the pointer 405 can push one of the cursors 7 to move on the rectangular frame while moving in the rectangular frame. In this embodiment, in the process of moving the first end of the first measuring rod 403 and the first end of the second measuring rod 404 from the deepest part of the measured gap to the gap opening. As the gap width increases, the pointer 405 will push the cursor 7 on its upper side to move continuously until it moves to the widest part of the gap; and as the gap width decreases, the pointer 405 will push the cursor 7 on its lower side to move continuously until it moves to the narrowest part of the gap. Therefore, when the first end of the first measuring rod 403 and the first end of the second measuring rod 404 move from the deepest part of the measured gap to the gap opening, a maximum width value and a minimum width value of the gap may be obtained according to the corresponding scales 601 of the two cursors 7 on the rectangular frame.

Figure 10:
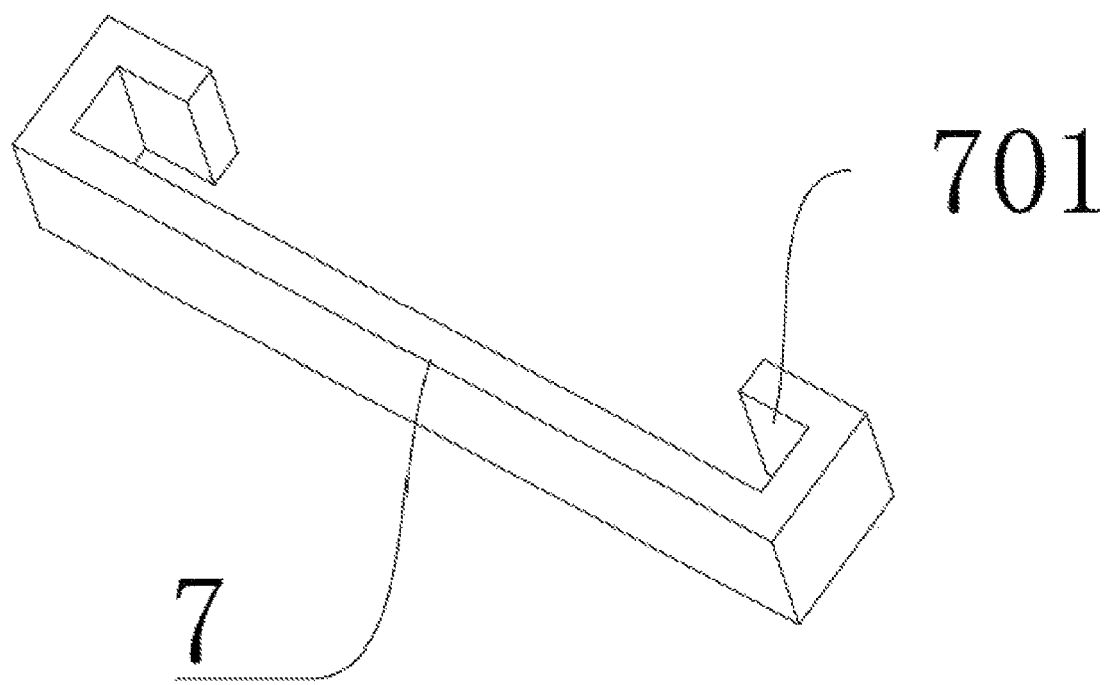
FIG. 10 is a schematic structural diagram of a cursor in FIG. 8.
Figure 11:
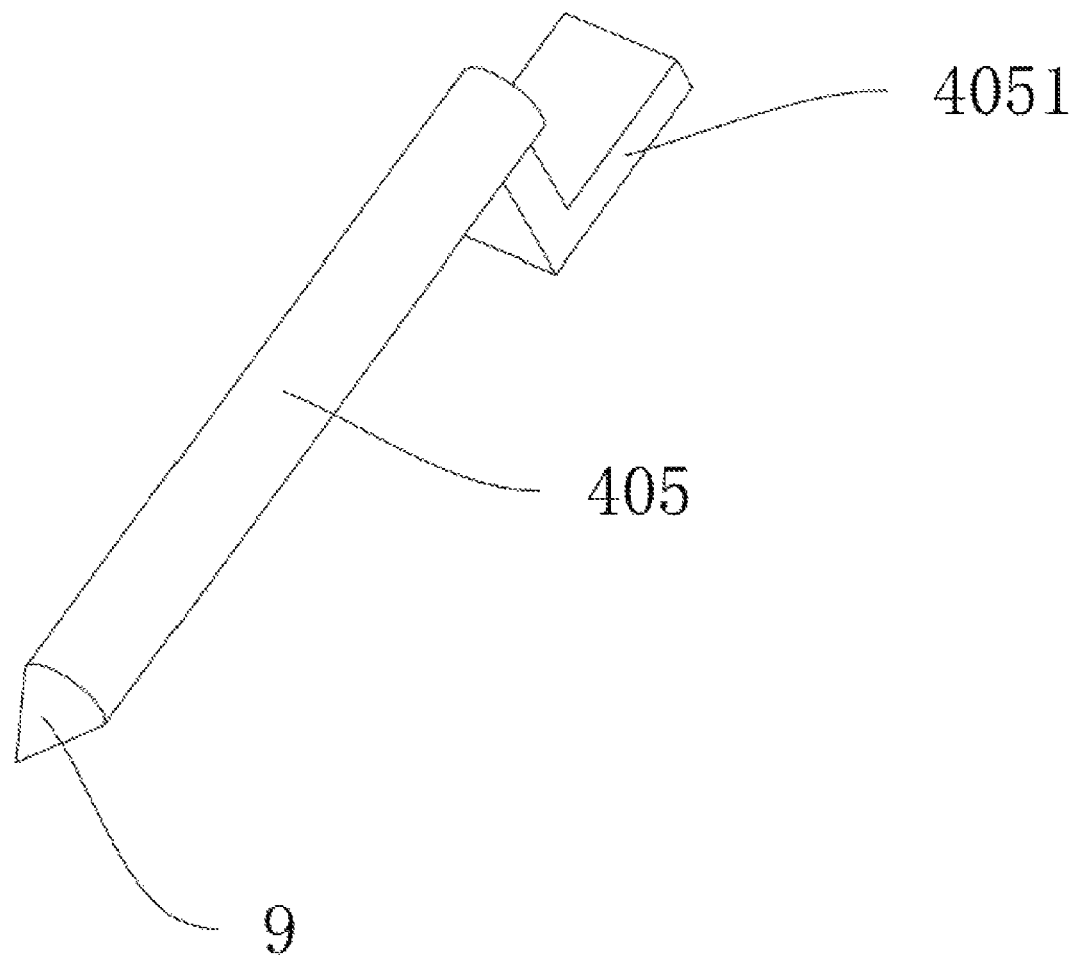
FIG. 11 is a schematic structural diagram when a pointer is connected to a second recording pen.
Figure 12:
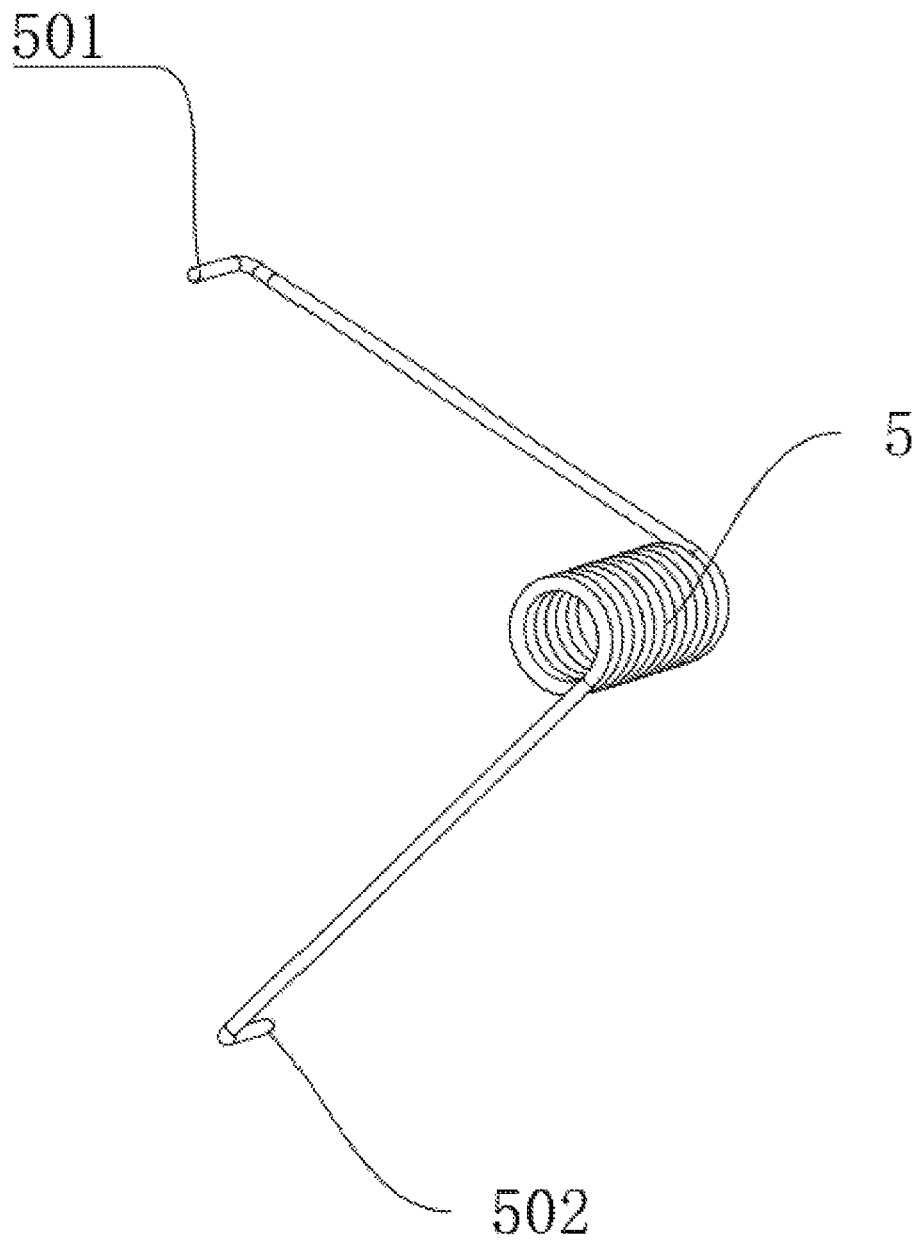
FIG. 12 is a schematic structural diagram of a torsion spring in FIG. 1.
Figure 13:
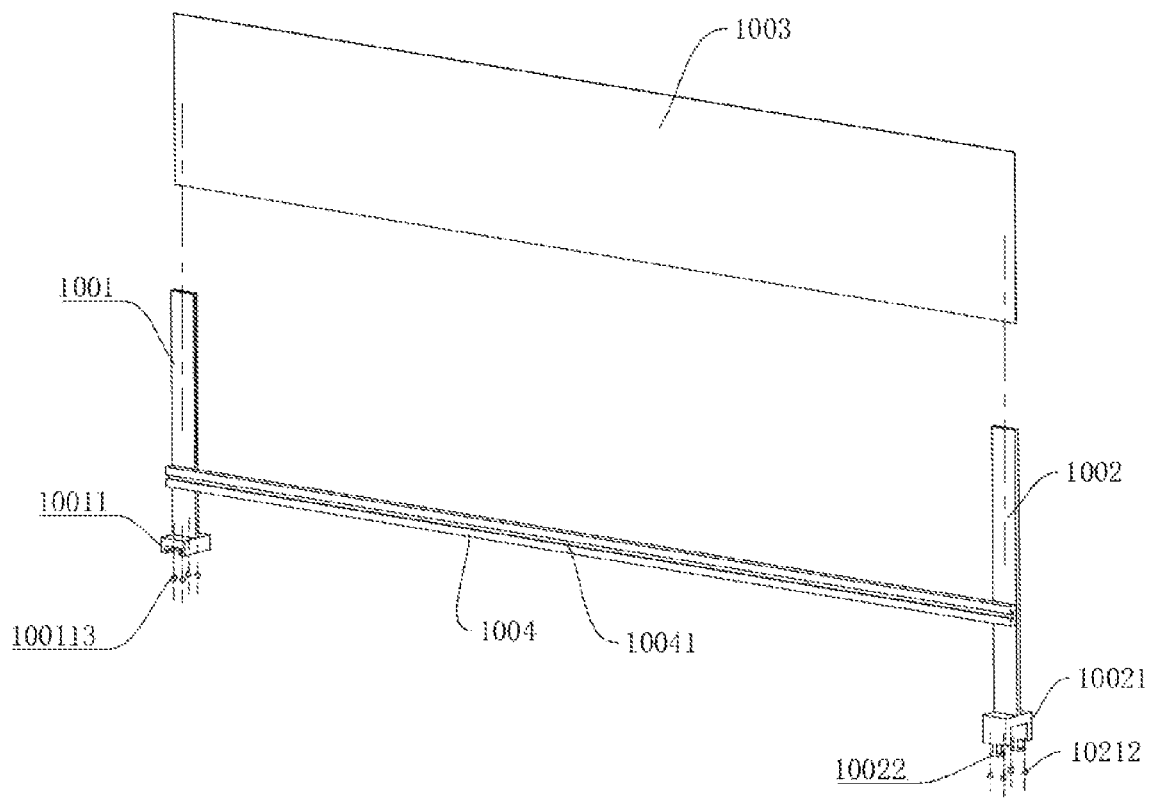
FIG. 13 is a schematic structural diagram when a tracing board of the tracing mechanism in FIG. 1 is separated from a first bracket and a second bracket.
Figure 14:
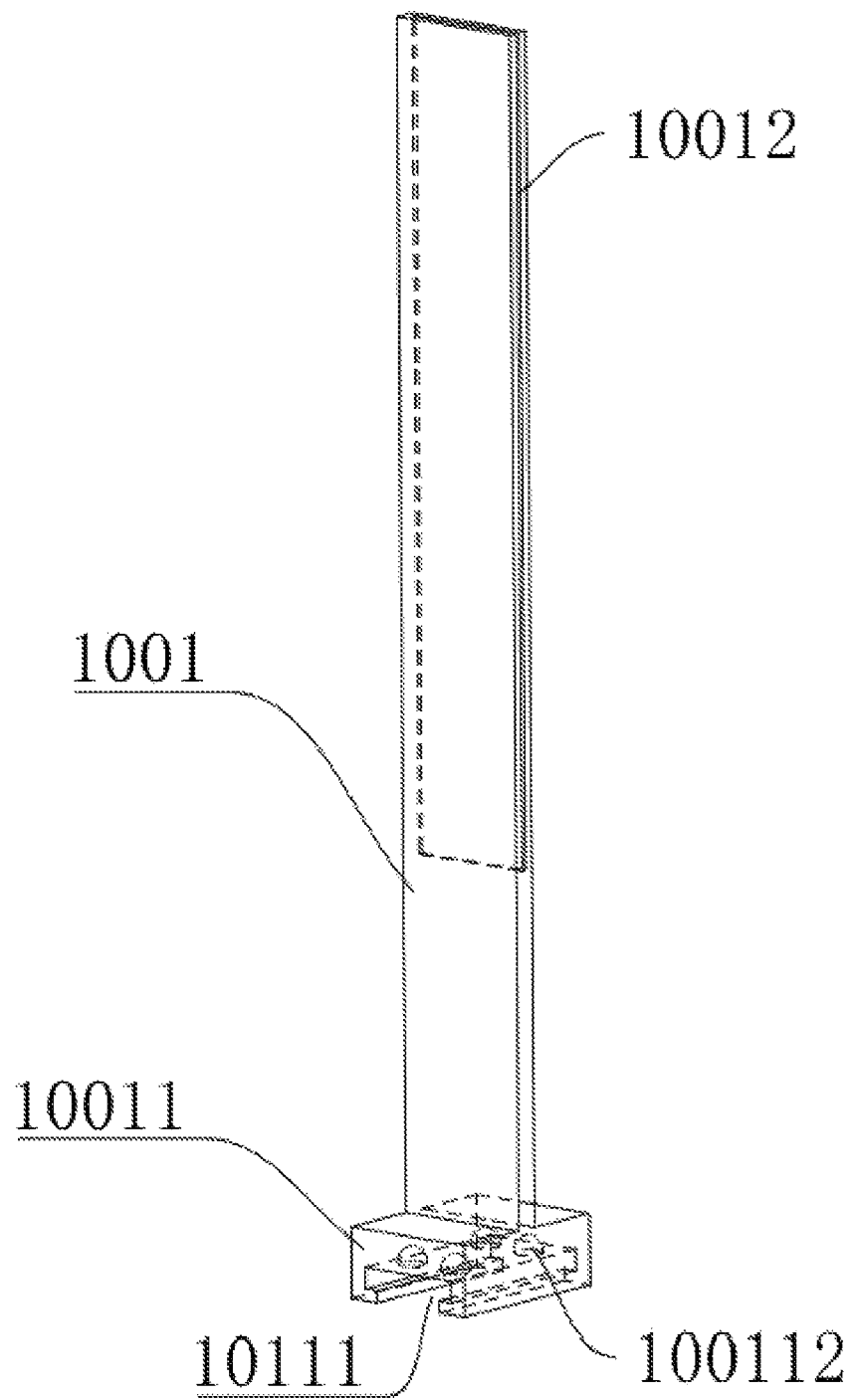
FIG. 14 is a schematic structural diagram of the first bracket in FIG. 13.

As shown in FIG. 10, each cursor 7 has a bayonet 701, wherein an internal dimension of the cursor 7 is the same as an external dimension of the scaleplate holder 6. The bayonet 701 encloses the scaleplate holder 6, is slidably connected to the scaleplate holder 6, and is remained fixed on the scaleplate holder 6 without an external load.

Figure 3:
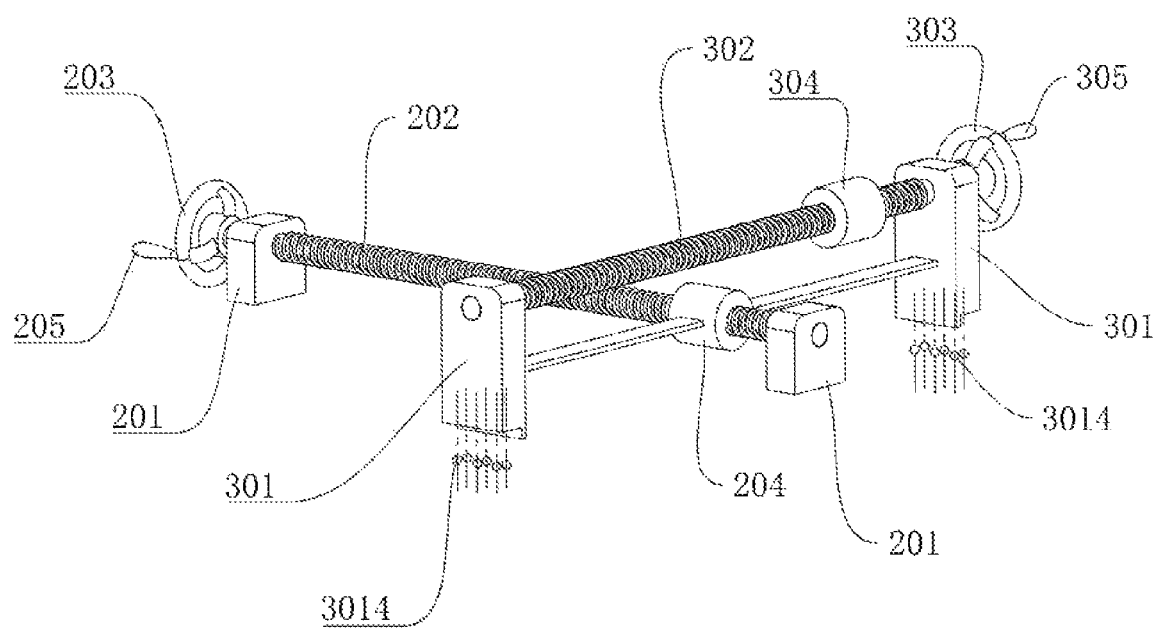
FIG. 3 is a schematic structural diagram of the driving assembly shown in FIG. 2.

On the basis of the above embodiment, in one preferred embodiment, as shown in FIG. 3, the first driving structure 2 includes two first supports 201, first screws 202, first hand wheels 203 and first ball nuts 204. The first supports 201 are fixedly disposed on the base 1, and spaced and opposite to each other. Each first support 201 is rotatably provided with the first screw hole 2011 inside. The first screw 202 is disposed in each first screw hole 2011, and the first end of the first screw 202 extends out of one of the first supports 201. The first hand wheel 203 is fixedly connected to the first end of a first screw 202. Specifically, the first hand wheel 203 is of a circular structure. The first hand wheel 203 is provided with a first fixing hole 2031, wherein the first screw 202 is fixedly disposed in the first fixing hole 2031, the first ball nut 204 sleeves the first screw 202 and is connected in cooperation with the first screw 202, and the first ball nuts 204 constitute the first moving part. In this embodiment, by rotating the first hand wheel 203, the first hand wheel 203 drives the first screw 202 to rotate in the first support 201, and the first ball nut 204 sleeves the first screw 202 and is connected in cooperation with the first screw 202, so that the first ball nut 204 moves along the first screw 202. In this embodiment, the first ball nut 204 is controlled to move to a desired position by manually rotating the first hand wheel 203, which is more convenient for actual measurement. In an alternative embodiment, the first driving structure 2 may be a first air cylinder, and correspondingly, the first moving part is a cylinder body or a piston rod of the first air cylinder. In another alternative embodiment, the first driving structure 2 may include a first motor, a first gear and a first rack, wherein the first motor is connected to the first gear, the first rack is in meshed connection with the first gear, and the first rack constitutes the first moving part.

Figure 6:
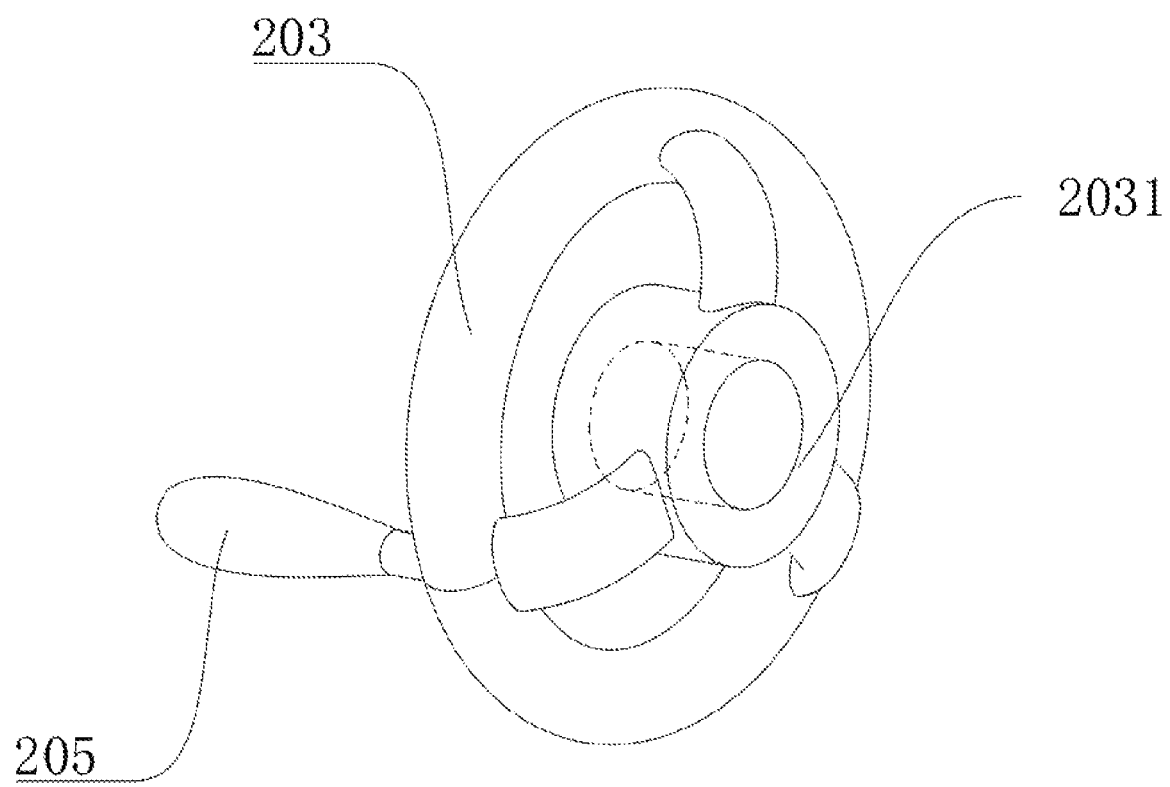
FIG. 6 is a schematic structural diagram of a first hand wheel in FIG. 3.
Figure 7:
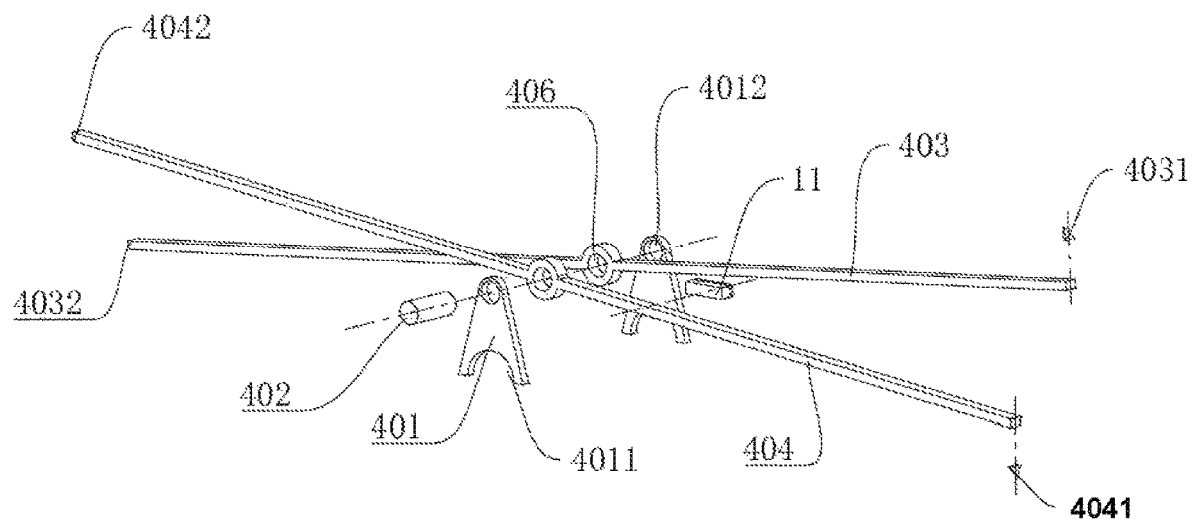
FIG. 7 is an exploded view of a measuring mechanism in FIG. 2.

As shown in FIGS. 3 and 6, in order to facilitate the operation of the first hand wheel 203, the first hand wheel 203 is provided with a first handle 205, and the first hand wheel 203 can be rotated by shaking the first handle 205.

Figure 2:
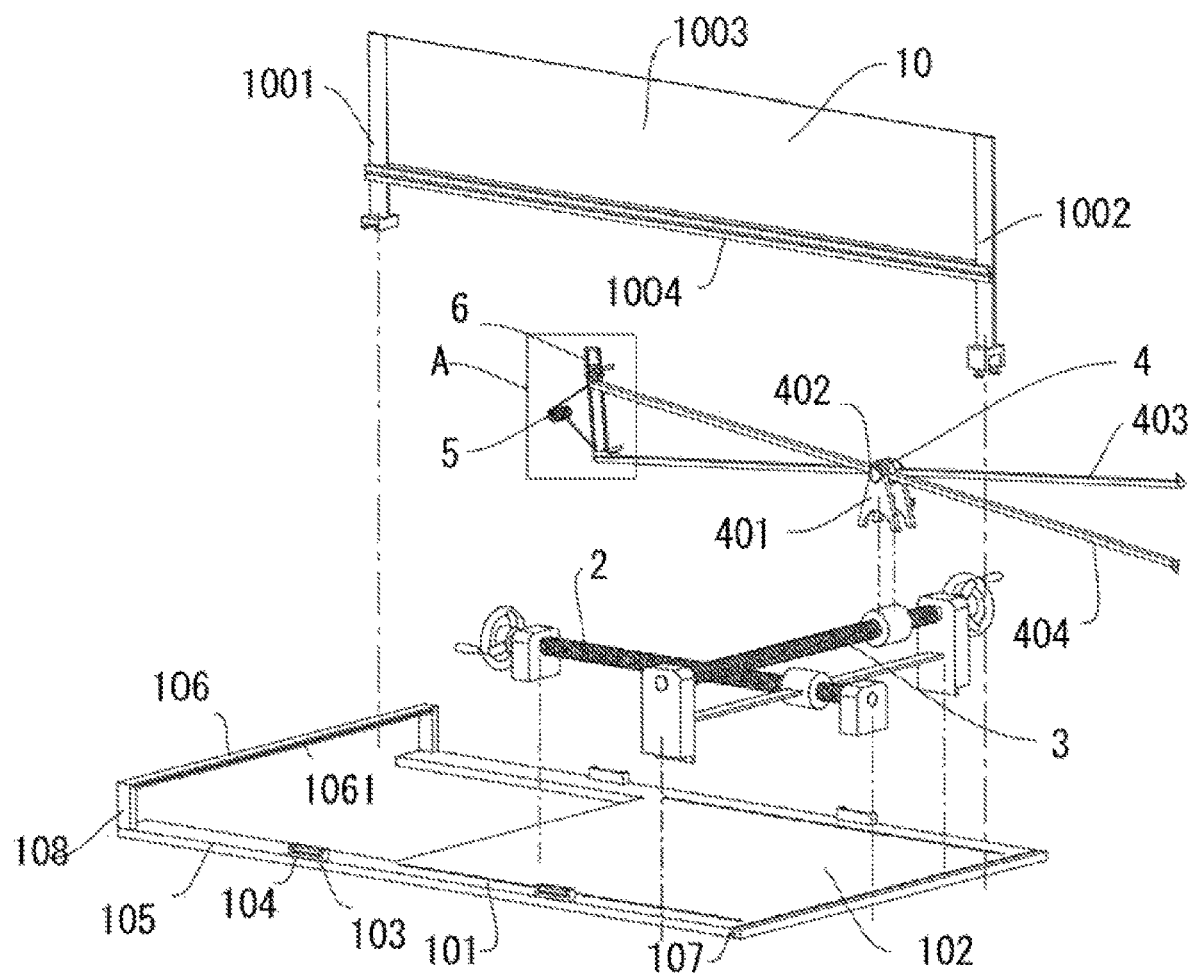
FIG. 2 is a schematic structural diagram of a base, a driving assembly, a measuring mechanism and a tracing mechanism in the gap measuring device shown in FIG. 1 while disassembled.

On the basis of the above embodiment, in one preferred embodiment, referring to FIGS. 2 and 3, the base 1 is provided with two first slideways 101 which are parallel to each other, and the second driving structure 3 includes second supports 301, second screws 302, second hand wheels 303 and second ball nuts 304. The two second supports 301 are spaced and opposite to each other. The second supports 301 are disposed in one-to-one correspondence to the first slideways 101. Each second support 301 is slidably disposed on the corresponding first slideway 101. Each second support 301 is connected to the first ball nut 204 through a connector. Each second support 301 is provided with a second screw hole 3011. The second screw 302 is rotatably disposed in the second screw hole 3011, and a first end of the second screw 302 extends out of one of the second supports 301. The second hand wheel 303 is fixedly connected to the first end of the second screw 302. The structure of the second hand wheel 303 is the same as that of the first hand wheel 203. The second ball nut 304 sleeves the second screw 302 and is connected in cooperation with the second screw 302. The second ball nuts 304 constitute the second moving part. In this embodiment, by rotating the second hand wheel 303, the second hand wheel 303 drives the second screw 302 to rotate in the second support 301, and the second ball nut 304 sleeves the second screw 302 and is connected in cooperation with the second screw 302, so that the second ball nut 304 moves along the second screw 302. In this embodiment, the second ball nut 304 is controlled to move to a desired position by manually rotating the second hand wheel 303, which is more convenient for actual measurement. In an alternative embodiment, the second driving structure 3 may be a second air cylinder, and correspondingly, the second moving part is a cylinder body or a piston rod of the second air cylinder. In another alternative embodiment, the second driving structure 3 may include a second motor, a second gear and a second rack, wherein the second motor is connected to the second gear, the second rack is in meshed connection with the second gear, and the second rack constitutes the second moving part.

Further referring to FIG. 3, in order to facilitate the operation of the second hand wheel 303, a second handle 305 is disposed on the second hand wheel 303, and the second hand wheel 303 can be rotated by shaking the second handle 305.

Figure 4:
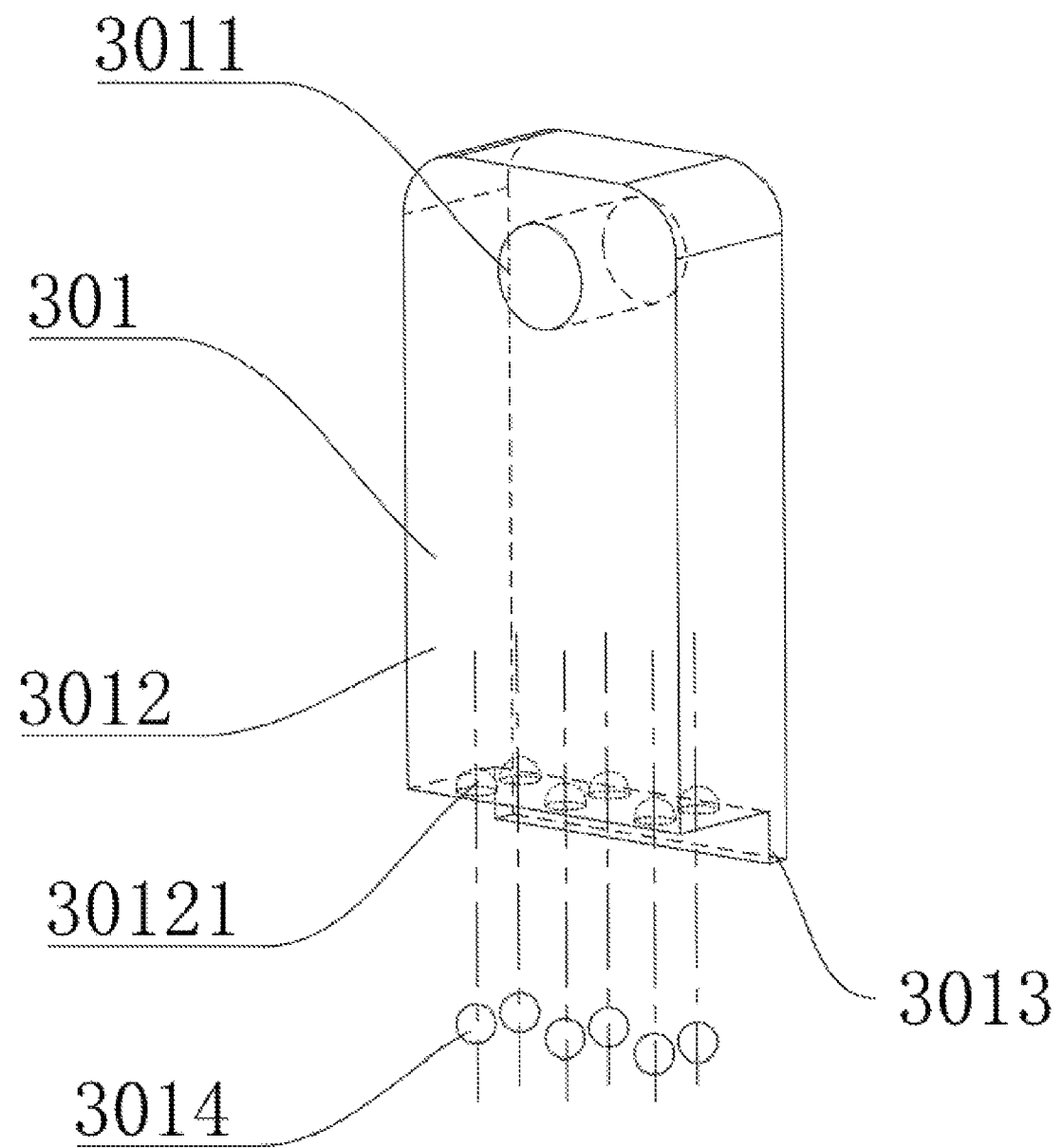
FIG. 4 is a schematic structural diagram of a second support in FIG. 3.
Figure 5:
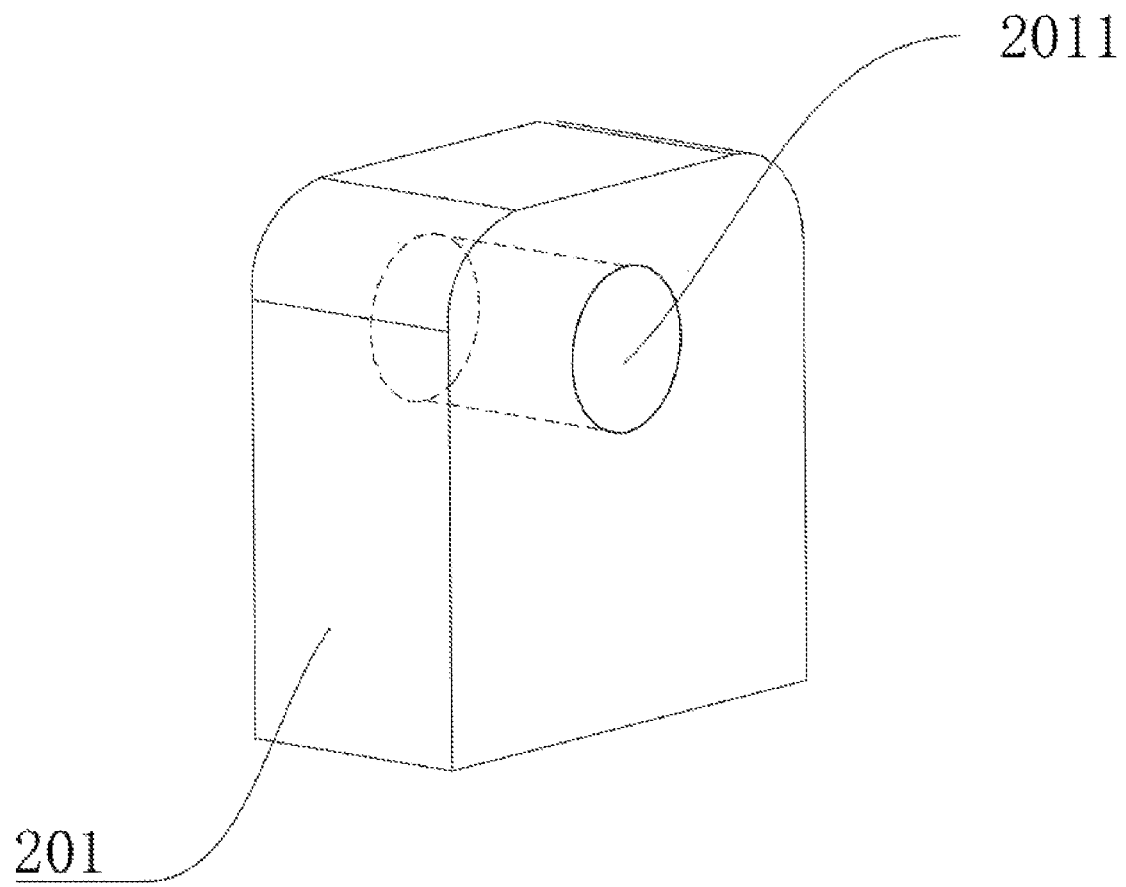
FIG. 5 is a schematic structural diagram of a first support in FIG. 3.

In the above embodiment, in one preferred embodiment, the base 1 includes a bottom plate 102; the bottom plate 102 is provided with two bar holes spaced from each other, and the bar holes constitute the first slideway 101. As shown in FIG. 4, the second support 301 includes a body part 3012 and a clamping edge 3013 formed by downward extension of one end of the body part 3012 facing the bottom plate 102; the clamping edge 3013 is disposed in the bar holes, wherein an end surface of one end of the body part 3012 facing the bottom plate 102 is provided with a plurality of first ball holes 30121, first balls 3014 are rollably disposed in each first ball hole 30121, and the first balls 3014 are in contact with the bottom plate 102. In this embodiment, the clamping edge 3013 is disposed in the bar holes, and the body part 3012 is slidably connected to the bottom plate 102 through the first balls 3014, so that the second support 301 slides on the base 1 in the first direction.

Specifically, the clamping edge 3013 is in a cuboid shape, wherein the width of the clamping edge 3013 is consistent with the width of the bar hole, and the height of the clamping edge 3013 may be slightly larger than the depth of the bar hole. Each first ball 3014 is spherical, wherein the diameter of the first ball 3014 is slightly smaller than the diameter of the first ball hole 30121.

On the basis of the above embodiment, in one preferred embodiment, the measuring rod bracket 401 has a fixed notch 4011, and the fixed notch 4011 is clamped on the second ball nut 304. In this embodiment, the measuring rod bracket 401 and the second ball nut 304 are connected in a simple and convenient way, facilitating the assembly of the entire gap measuring device. In other alternative embodiments, the measuring rod bracket 401 may be connected to the second ball nut 304 by means of screws or in a welding way.

As shown in FIG. 3, the second ball nut 304 is cylindrical, and the fixed notch 4011 is semicircular.

On the basis of the above embodiment, in one preferred embodiment, a measuring rod shaft hole 406 is respectively formed in the middle of the first measuring rod 403 and the middle of the second measuring rod 404, the measuring rod bracket 401 is provided with a bracket shaft hole 4012, and the measuring rod shaft 402 sequentially passes through the bracket shaft hole 4012 and the measuring rod shaft hole 406. In this embodiment, the first measuring rod 403, the second measuring rod 404 and the measuring rod bracket 401 are connected in a relatively simple way, which is convenient for the assembly of the entire gap measuring device. Specifically, a total of two measuring rod brackets 401 are provided, wherein the first measuring rod 403 and the second measuring rod 404 are located between the two measuring rod brackets 401. The diameter of the measuring rod shaft 402 is the same as an inner diameter of each of the measuring rod shaft hole 406 and the bracket shaft hole 4012.

On the basis of the above embodiment, in one preferred embodiment, a second end of the first measuring rod 403 is provided with a first spring fixing hole 4032, a second end of the second measuring rod 404 is provided with a second spring fixing hole 4042, the first fixed leg 501 is inserted in the first spring fixing hole 4032 and can rotate relative to the first measuring rod 403, and the second fixed leg 502 is inserted in the second spring fixing hole 4042 and can rotate relative to the second measuring rod 404. In this embodiment, by forming the first spring fixing hole 4032 in the second end of the first measuring rod 403 and forming the second spring fixing hole 4042 in the second end of the second measuring rod 404, the first fixed leg 501 is inserted in the first spring fixing hole 4032, and the second fixed leg 502 is inserted in the second spring fixing hole 4042, facilitating the connection of the torsion spring 5 with the first measuring rod 403 and the second measuring rod 404. Of course, in other alternative embodiments, the first fixed leg 501 and the second fixed leg 502 of the torsion spring 5 may be connected to the first measuring rod 403 and the second measuring rod 404 respectively through other connection ways.

On the basis of the above embodiment, in one preferred embodiment, the first detection head 4031 and the second detection head 4041 each have a cross-section of right triangle, wherein one of right-angled sides is connected to the first measuring rod 403 or the second measuring rod 404. In this embodiment, since the first detection head 4031 and the second detection head 4041 each have a cross-section of right triangle, wherein the width value of the gap may be obtained by the scale value pointed by the pointer 405 on the scaleplate holder 6 plus the lengths of the right-angled sides of the two right triangles. Of course, in one alternative embodiment, the first detection head 4031 and the second detection head 4041 each may be of a needle-like structure. In another alternative embodiment, the cross-section of each of the first detection head 4031 and the second detection head 4041 may also be of an ordinary isosceles triangle or equilateral triangle.

On the basis of the above embodiment, in one preferred embodiment, the base 1 is provided with a plurality of binding seats 103, wherein the binding seat 103 has an opening facing the outside of the base 1, a binding rod 104 is disposed in each binding seat 103, and the binding rod 104 is adapted to be connected to the measured object through a binding member. In this embodiment, each binding rod 104 is connected to the measured object through the binding member. That is, the base 1 may be fixed on the measured object, while facilitating the removal of the base 1 from the measured object. In other alternative embodiments, the base 1 may be connected to the measured object by screws.

Specifically, as shown in FIG. 2, the base 1 is a U-shaped plate, including a base plate 102, and two extension arms 105 connected to the bottom plate 102, wherein one side of each extension arm 105 is flush with one side of the bottom plate 102, and the binding seats 103 are disposed on both sides of the bottom plate 102 and the extension arms 105. FIG. 2 shows a total of four binding seats 103. The first slideways 101 are respectively close to the two sides of the bottom plate 102, and are parallel to the long side of the bottom plate 102. Of course, in other alternative embodiments, the bottom plate 102 may be an entire flat plate.

On the basis of the above embodiments, in one preferred embodiment, the second end of the first measuring rod 403 is provided with a first recording pen 8, the pointer 405 is connected to a second recording pen 9, and the first recording pen 8 is parallel to the second recording pen. The base 1 is also provided with a second slideway 106 and a third slideway 107. The second slideway 106 and the third slideway 107 are parallel to each other and are respectively located at two ends of the base 1. The second slideway 106 and the third slideway 107 have the same or parallel length extension direction as the second direction. The gap measuring device also includes a tracing mechanism 10. The tracing mechanism 10 includes a first support 1001, a second support 1002, a tracing board 1003, and a fourth slideway 1004. The first bracket 1001 is slidably disposed on the second slideway 106, and the second bracket 1002 is slidably disposed on the third slideway 107. The tracing board 1003 is connected between the first bracket 1001 and the second bracket 1002. The first recording pen 8 and the second recording pen 9 are both able to contact the tracing board 1003. Two ends of the fourth slideway 1004 are respectively connected to the first bracket 1001 and the second bracket 1002, wherein a length extension direction of the fourth slideway 1004 is parallel to the first direction. The measuring rod bracket 401 is connected to the fourth slideway 1004 through the slider 11, and the slider 11 may be slidably disposed on the fourth slideway 1004. In this embodiment, by providing the first recording pen 8, the second recording pen 9 and the tracing board 1003, in the process of moving the first end of the first measuring rod 403 and the first end of the second measuring rod 404 from the deepest part of the measured gap to the gap opening, the measuring rod bracket 401 moves along the fourth slideway 1004. Correspondingly, the first recording pen 8 and the second recording pen 9 also move accordingly. The first recording pen 8 and the second recording pen 9 depict two profile curves on the tracing board 1003, which are the profile curves at the corresponding gap. The full view of the gap may be obtained according to the profile curves, including the widest position and the narrowest position of the gap.

On the basis of the above embodiments, in one preferred embodiment, a first pedestal 10011 is disposed at the bottom of the first bracket 1001. The first pedestal 10011 has a first groove 100111 having an opening facing downward. The shape of the first groove 100111 is adapted to the second slideway 106. The top wall of the first groove 100111 is provided with a plurality of second ball holes 100112 in which second balls 100113 are rollably disposed, and the second balls 100113 are in contact with the second slideway 106. In this embodiment, the arrangement of the second balls 100113 facilitates the sliding of the first bracket 1001 along the second slideway 106.

Specifically, each second ball 100113 is spherical, and the diameter of the second ball 100113 is slightly smaller than the diameter of the second ball hole 100112.

In combination with FIG. 2, the second slideway 106 is higher than the upper surface of the bottom plate 102, the second slideway 106 is connected to the end part of the extension arm 105 through a supporting leg 108, a third sliding groove 1061 is formed in each of two sides of the second slideways 106, and two sides of the first groove of the first pedestal 10011 are embedded in the third sliding groove 1061, such that the first pedestal 10011 may be connected to the second slideway 106 at one end of the second slideway 106, facilitating the assembly of the entire gap measuring device. The second slideway 106 is higher than the upper surface of the bottom plate 102, which avoids interference between the movement of the first bracket 1001 and the base 1.

On the basis of the above embodiment, in one preferred embodiment, a second pedestal 10021 is disposed at the bottom of the second bracket 1002; an inverted T key 10022 is connected to the bottom of the second pedestal 10021; the third slideway 107 is a first sliding groove having an inverted T cross-section; the inverted T key 10022 is disposed in the first sliding groove; a plurality of third ball holes 10211 is formed in the bottom of the second pedestal 10021; third balls 10212 are rollably disposed in each third ball hole 10211; and the third balls 10212 are in contact with the surface of the base 1. In this embodiment, the third balls 10212 are provided to facilitate the second bracket 1002 to slide along the third slideway 107. At the same time, the second bracket 1002 may be mounted from one end of the third slideway 107, facilitating the assembly of the entire gap measuring device.

Specifically, each third ball 10212 is spherical, and the diameter of the third ball 10212 is slightly smaller than the diameter of the third ball hole 10211.

Figure 15:
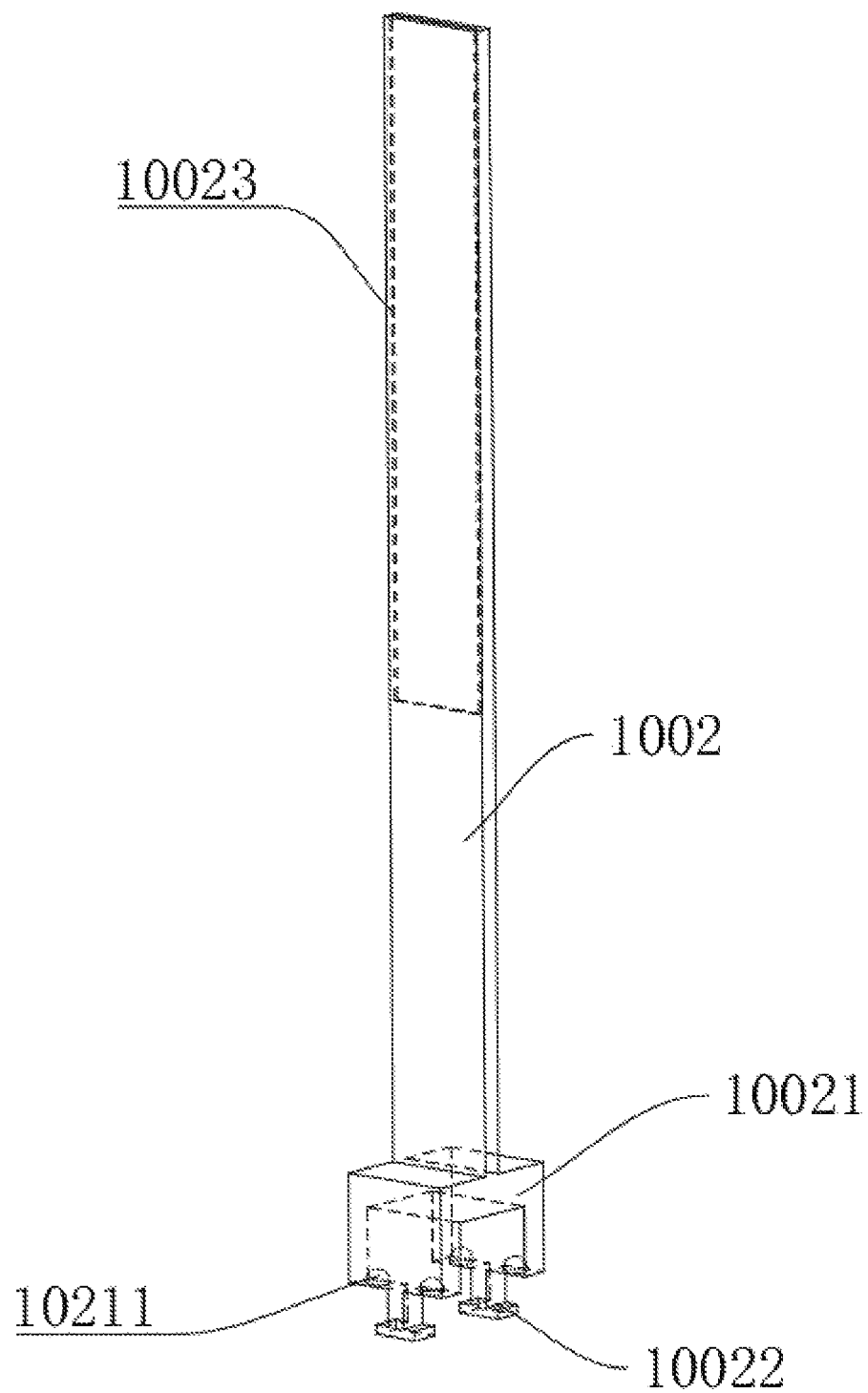
FIG. 15 is a schematic structural diagram of the second bracket in FIG. 13.
Figure 16:
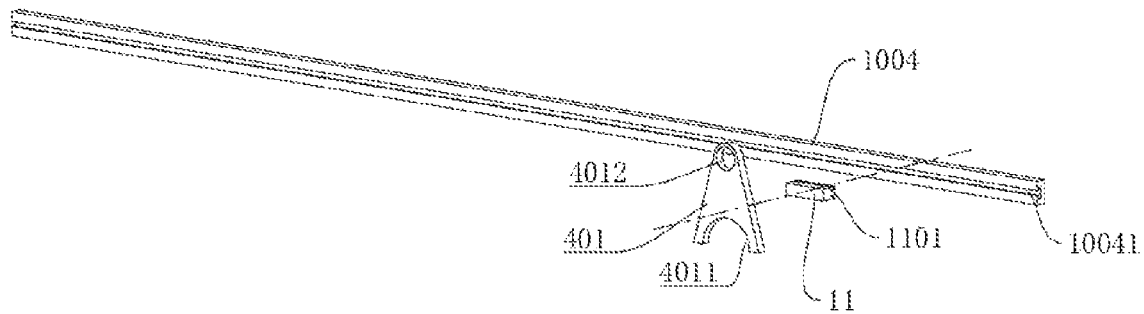
FIG. 16 is a structural schematic diagram when a fourth slideway is separated from a measuring rod bracket.
Figure 17:
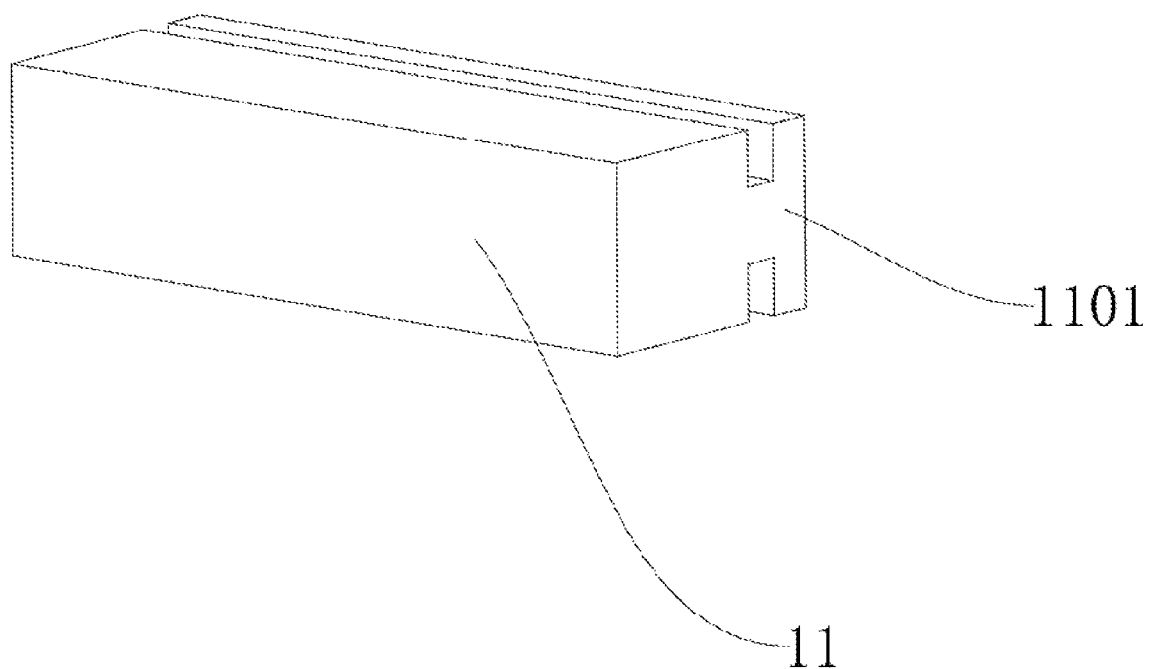
FIG. 17 is a schematic structural diagram of a slider in FIG. 16.

In combination with FIG. 15, a total of two inverted T keys 10022 are connected to the bottom of the second pedestal 10021, and the two inverted T keys 10022 are both disposed in the first slideway.

On the basis of the above embodiments, in one preferred embodiment, the first bracket 1001 is provided with a first clamping groove 10012; the first clamping groove 10012 has a first top opening and a first side opening facing the second bracket 1002; the second bracket 1002 is provided with a second clamping groove 10023; the second clamping groove 10023 has a second top opening and a second side opening facing the first bracket 1001; and two ends of the tracing board 1003 are clamped in the first clamping groove 10012 and the second clamping groove 10023, respectively. In this embodiment, one end of the tracing board 1003 is clamped into the first clamping groove 10012 through the first top opening, and the other end of the tracing board 1003 is clamped into the second clamping groove 10023 through the second top opening, which facilitates the fixed assembly and disassembly of the tracing board 1003. When the tracing board 1003 is not required, or when a new tracing board 1003 needs to be replaced after completing drawing a gap profile curve, the tracing board 1003 may be moved upward away from the first clamping groove 10012 and the second clamping groove 10023.

On the basis of the above embodiments, in one preferred embodiment, the fourth slideway 1004 is provided with a second clamping groove 10041; the second slideway 10041 has a T-shaped cross-section; the second sliding groove 10041 extends in a length direction of the fourth slideway 1004; and the slider 11 includes a T-shaped part 1101 embedded in the second sliding groove 10041. In this embodiment, the slider 11 may be mounted into the second sliding groove 10041 from one end of the fourth slideway 1004, which facilitates the assembly of the entire gap measuring device.

Specifically, two measuring rod brackets 401 are provided, only one of which is connected to the slider 11. In this embodiment, the measuring rod bracket 401 may drive the fourth slideway 1004 to move together with the second ball nut 304 while moving with the second ball nut 304 in the second direction, thereby driving the tracing mechanism 10 to move together.

It is obvious that the above description only gives examples for clarity, which does not impose a limitation on their embodiments. A person skilled in the art can make various changes or modifications on the basis of the above description. There is no need and inability to give all exhaustive embodiments. However, the apparent changes or modifications derived therefrom still fall within the protection scope of the present invention.

What is claimed is:

1. A gap measuring device, comprising:
 a base (1), adapted to be fixedly disposed on a measured object;
 a driving assembly, disposed on the base (1), the driving assembly including a first driving structure (2) and a second driving structure (3), the first driving structure (2) comprising a first moving part, the first moving part being capable of moving on the base (1) in a first direction, the second driving structure (3) being connected to the first moving part, the second driving structure (3) comprising a second moving part, the second moving part being capable of moving in a second direction relative to the first moving part, and the second direction being perpendicular to the first direction;
 a measuring mechanism (4), comprising a measuring rod bracket (401) disposed on the second moving part, as well as a first measuring rod (403) and a second measuring rod (404) which are hinged with the measuring rod bracket (401) through a measuring rod shaft (402), a first end of the first measuring rod (403) being provided with a first detection head (4031), a first end of the second measuring rod (404) being provided with a second detection head (1041), a second end of the second measuring rod (404) being provided with a pointer (405), the first detection head (4031) and the second detection head (4041) being located on the same side of the measuring rod bracket (401);
 a torsion spring (5), comprising a first fixed leg (501) and a second fixed leg (502), the first fixed leg (501) being connected to a second end of the first measuring rod (403), and the second fixed leg (502) being connected to the second end of the second measuring rod (404); and
 a scaleplate holder (6), one end of which being fixedly connected to the second end of the first measuring rod (403), the scaleplate holder (6) comprising a rectangular frame provided with scales (601), the pointer (405) being disposed in the rectangular frame, wherein
 the second end of the first measuring rod (403) is provided with a first recording pen (8); the pointer (405) is connected to a second recording pen (9); the first recording pen (8) is parallel to the second recording pen (9); the base (1) is further provided with a second slideway (106) and a third slideway (107); the second slideway (106) and the third slideway (107) are parallel to each other and are located at both ends of the base (1), respectively; a length extension direction of the second slideway (106) and the third slideway (107) is consistent or parallel to the second direction; the gap measuring device further comprises a tracing mechanism (10), the tracing mechanism (10) comprising:
 a first bracket (1001), slidably disposed on the second slideway (106);
 a second bracket (1002), slidably disposed on the third slideway (107);
 a tracing board (1003), connected between the first bracket (1001) and the second bracket (1002), the first recording pen (8) and the second recording pen (9) being both capable of contacting the tracing board (1003); and
 a fourth slideway (1004), two ends of which being respectively connected to the first bracket (1001) and the second bracket (1002), a length extension direction of the fourth slideway (1004) being parallel to the first direction, the rod measuring bracket (401) being connected to the fourth slideway (1004) through a slider (11), the slider (11) being slidably disposed on the fourth slideway (1004).

2. The gap measuring device according to claim 1, wherein the rectangular frame is provided with two cursors (7) which are spaced from each other, the two cursors (7) are respectively located on both sides of the pointer (405), and the pointer (405) is capable of pushing one of the cursors (7) to move on the rectangular frame while moving in the rectangular frame.

3. The gap measuring device according to claim 1, wherein the first driving structure (2) comprises:
 two first supports (201), fixedly disposed on the base (1), the two first supports (201) being spaced and opposite to each other, each of the first supports (201) being rotatably provided with a first screw hole (2011);
 first screws (202), disposed in the first screw holes (2011), a first end of each first screw (202) extending out of one of the first supports (201);
 first hand wheels (203), fixedly connected to the first ends of the first screws (202); and first ball nuts (204), sleeving the first screws (202) and being connected in cooperation with the first screws (202), the first ball nuts (204) constituting the first moving part.

4. The gap measuring device according to claim 3, wherein the base (1) is provided with two first slideways (101) parallel to each other, and the second driving structure (3) comprises:
- two second supports (301), spaced and disposed relative to each other, the second supports (301) are disposed in one-to-one correspondence to the first slideways (101), each second support (301) being slidably disposed on the corresponding first slideway (101), each of the second supports (301) being connected to the first ball nut (204) through a connector and provided with a second screw hole (3011);
- second screws (302), rotatably disposed in the first screw holes (3011), a first end of each second screw (302) extending out of one of the second supports (301);
- second hand wheels (303), fixedly connected to the first ends of the second screws (302); and
- second ball nuts (304), sleeving the second screws (302) and being connected in cooperation with the second screws (302), the second ball nuts (304) constituting the second moving part.

5. The gap measuring device according to claim 4, wherein the base (1) comprises a bottom plate (102); the bottom plate (102) is provided with two bar holes spaced from each other, and the bar holes constitute the first slideway (101); each second support (301) comprises a body part (3012) and a clamping edge (3013) formed by downward extension of one end of the body part (3012) facing the bottom plate (102); the clamping edge (3013) is disposed in the bar holes; an end surface of one end of the body part (3012) facing the bottom plate (102) is provided with a plurality of first ball holes (30121); first balls (3014) are rollably disposed in the first ball hole (3014); and the first balls (3014) are in contact with the bottom plate (102).

6. The gap measuring device according to claim 4, wherein the measuring rod bracket (401) has a fixed notch (4011), the fixed notch (4011) being clamped on the second ball nut (304);
- and/or, a measuring rod shaft hole (406) is formed in the middle of each of the first measuring rod (403) and the second measuring rod (404), the measuring rod bracket (401) is provided with a bracket shaft hole (4012), and the measuring rod shaft (402) passes through the bracket shaft hole (4012) and the rod shaft holes (406) in sequence;
- and/or, a second end of the first measuring rod (403) is provided with a first spring fixing hole (4032), a second end of the second measuring rod (404) is provided with a second spring fixing hole (4042), the first fixed leg (501) is inserted in the first spring fixing hole (4032) and is capable of rotating relative to the first measuring rod (403), and the second fixed leg (502) is inserted in the second spring fixing hole (4042) and is capable of rotating relative to the second measuring rod (404);
- and/or, the first detection head (4031) and the second detection head (4041) each have a cross-section of a right triangle, wherein one of a right-angled edge is connected to the first measuring rod (403) or the second measuring rod (404).

7. The gap measuring device according to claim 1, wherein the base (1) is provided with a plurality of binding seats (103), the binding seats (103) each have an opening facing the outside of the base (1), and a binding rod (104) is disposed in each binding seat (103), and is adapted to be connected to the measured object through a binding member.

8. The gap measuring device according to claim 1, wherein a first pedestal (10011) is disposed at the bottom of the first bracket (1001); the first pedestal (10011) is provided with a first groove (100111) with an opening facing downward; a shape of the first groove (100111) is adaptive with the second slideway (106); the top wall of the first groove (100111) is provided with a plurality of second ball holes (100112); second balls (100113) are rollably disposed in each second ball hole (100112); the second balls (100113) are in contact with the second slideway (106);
- and/or, a second pedestal (10021) is disposed at the bottom of the second bracket (1002); an inverted T key (10022) is connected to the bottom of the second pedestal (10021); the third slideway (107) is a first sliding groove having an inverted T cross-section; an inverted T key (10022) is disposed in the first sliding way, a plurality of third ball holes (10211) is formed in the bottom of the second pedestal (10021); third balls (10212) are rollably disposed in each third ball hole (10211); the third balls (10212) are in contact with the surface of the base (1);
- and/or, the first bracket (1001) is provided with a first clamping groove (10012); the first clamping groove (10012) has a first top opening and a first side opening facing the second bracket (1002); the second bracket (1002) is provided with a second clamping groove (10023); the second clamping groove (10023) has a second top opening and a second side opening facing the first bracket (1001); and two ends of the tracing board (1003) are clamped in the first clamping groove (10012) and the second clamping groove (10023), respectively.

9. The gap measuring device according to claim 1, wherein the fourth slideway (1004) is provided with a second sliding groove (10041); the second sliding groove (10041) has a T-shaped cross-section; the second sliding groove (10041) extends in a length direction of the fourth slideway (1004); and the slider (11) comprises a T-shaped part (1101) embedded in the second sliding groove (10041).

* * * * *